United States Patent
Zhu et al.

(10) Patent No.: US 6,654,032 B1
(45) Date of Patent: *Nov. 25, 2003

(54) INSTANT SHARING OF DOCUMENTS ON A REMOTE SERVER

(75) Inventors: Min Zhu, Los Altos Hills, CA (US); Guanghong Yang, Mountain View, CA (US); Zheng Yuan, San Jose, CA (US); Song Xiang Wei, Mountainview, CA (US)

(73) Assignee: Webex Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/471,938

(22) Filed: Dec. 23, 1999

(51) Int. Cl.⁷ .............................. G09G 5/00; G06F 15/16
(52) U.S. Cl. ...................... 345/753; 345/751; 709/204; 709/205
(58) Field of Search ................................ 345/751–759; 709/201–207, 245–246

(56) References Cited

U.S. PATENT DOCUMENTS

| | | | |
|---|---|---|---|
| 5,051,926 A | * 9/1991 | Stevens et al. ............. 358/1.14 |
| 5,577,188 A | 11/1996 | Zhu |
| 5,623,603 A | 4/1997 | Jiang et al. |
| 5,694,544 A | * 12/1997 | Tanigawa et al. ............ 345/753 |
| 5,821,925 A | * 10/1998 | Carey et al. ................. 345/419 |
| 5,893,126 A | * 4/1999 | Drews et al. ................ 345/781 |
| 5,903,716 A | * 5/1999 | Kimber et al. ............. 358/1.13 |
| 5,909,213 A | * 6/1999 | Martin ....................... 345/753 |
| 5,920,694 A | * 7/1999 | Carleton et al. ............ 345/753 |
| 6,075,615 A | * 6/2000 | Nakamura ................. 358/1.14 |
| 6,119,137 A | * 9/2000 | Smith et al. ................ 707/513 |
| 6,144,991 A | * 11/2000 | England ..................... 345/733 |
| 6,185,683 B1 | * 2/2001 | Ginter et al. ................. 705/52 |
| 6,230,171 B1 | * 5/2001 | Pacifici et al. .............. 345/751 |
| 6,266,150 B1 | * 7/2001 | Brossman et al. ......... 358/1.12 |
| 6,342,906 B1 | * 1/2002 | Kumar et al. ............... 345/751 |
| 6,343,313 B1 | * 1/2002 | Salesky et al. ............. 345/751 |
| 6,487,599 B1 | * 11/2002 | Smith et al. ................ 709/229 |
| 6,529,956 B1 | * 3/2003 | Smith et al. ................ 709/229 |

\* cited by examiner

*Primary Examiner*—Sy D. Luu
(74) *Attorney, Agent, or Firm*—Fish & Richardson P.C.

(57) ABSTRACT

An apparatus, method, and computer program for instant remote document sharing. In one embodiment, referred to as "remote document sharing," a file on a remote server is converted to a "shared document" which is distributed to the members of a data conference for review. In another embodiment, referred to as "remote application viewing," the "owner" of a document on a remote server shares the screens created by an application associated with the document. The other members of the data conference can view the screens, but cannot interact with the application. In another embodiment, referred to as "remote application sharing," the "owner" of a document on a remote server shares the screens created by an application associated with the document. The other members of the data conference can view the screens and interact with the application.

45 Claims, 11 Drawing Sheets

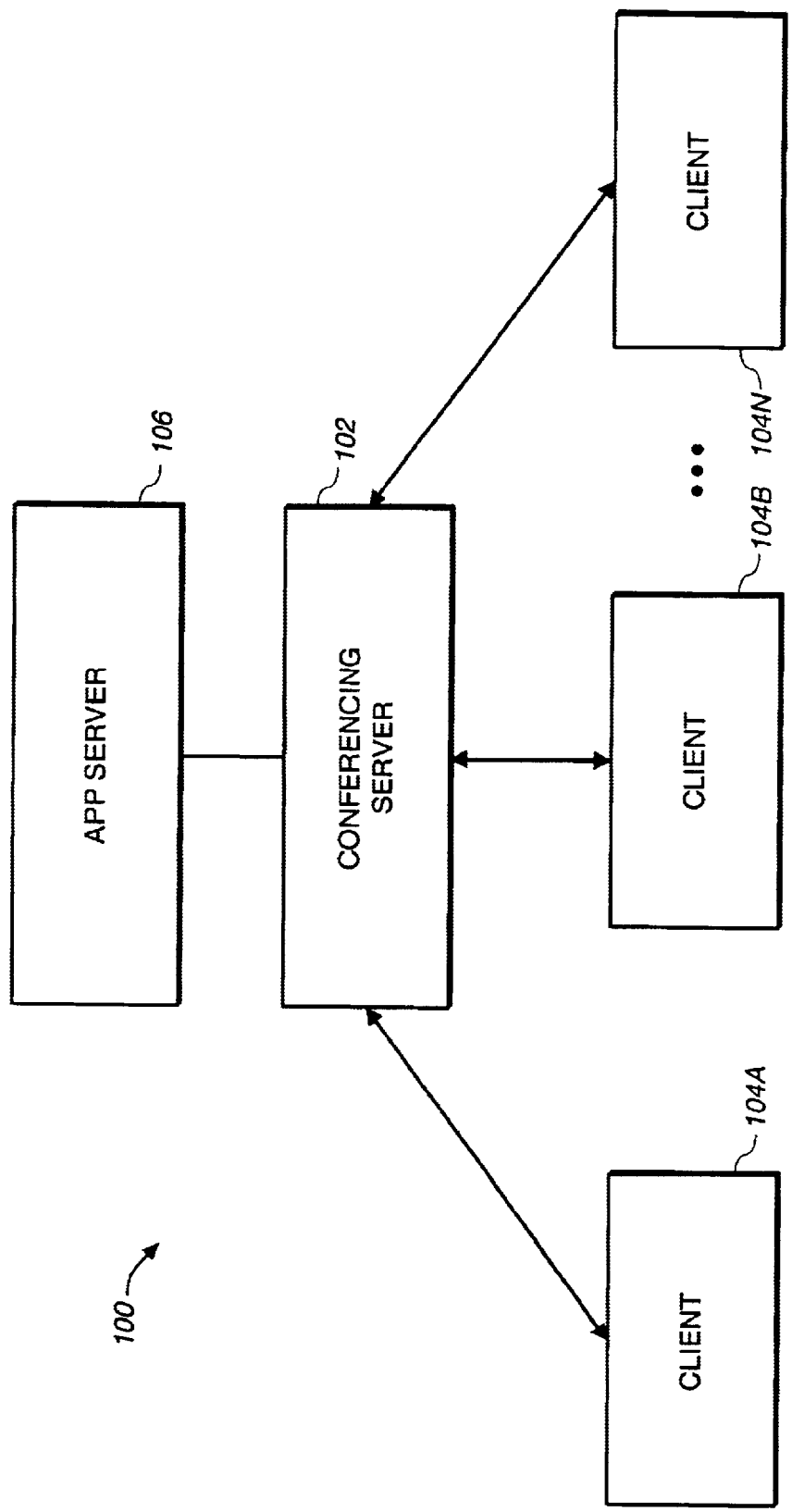
FIG._1

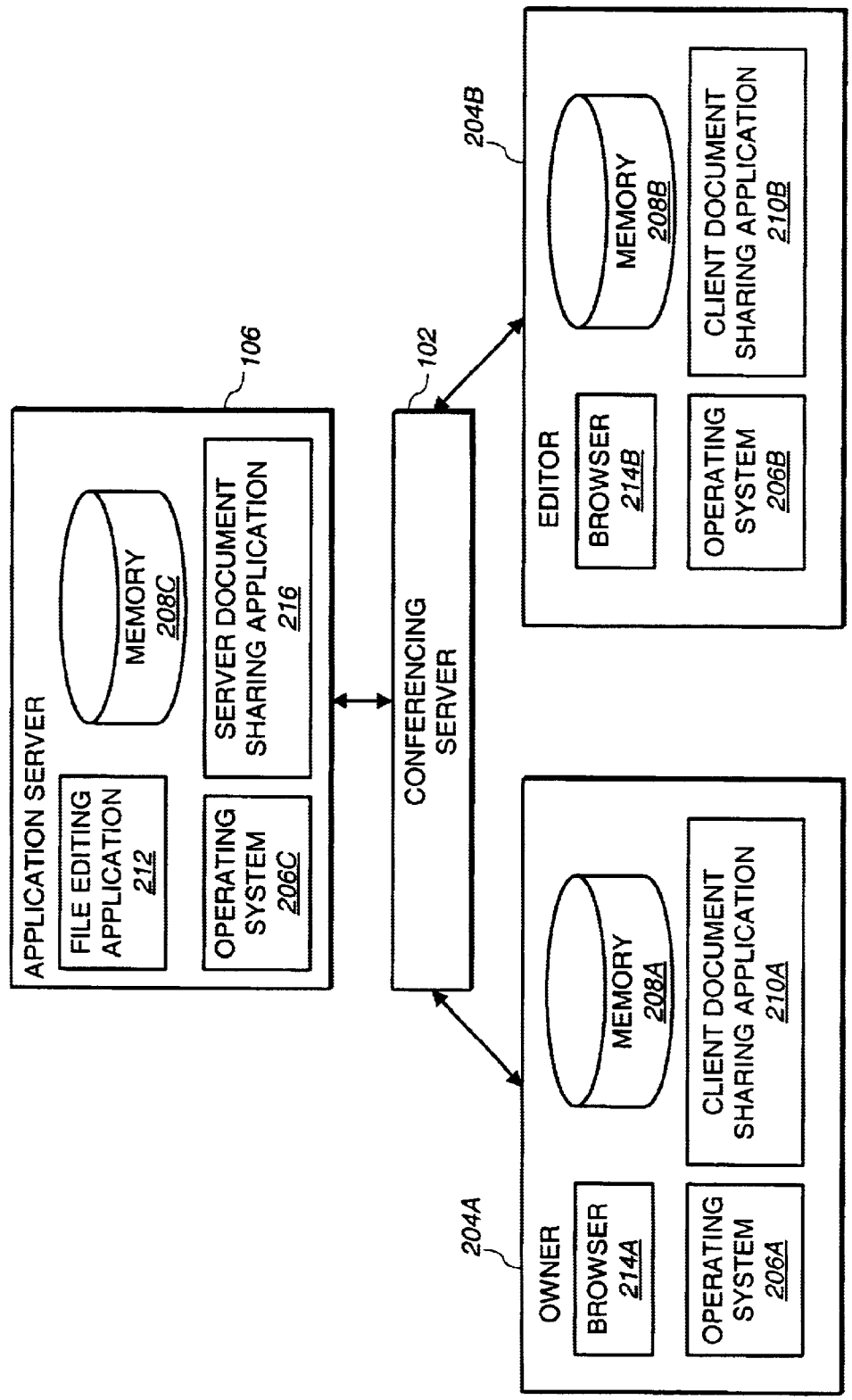
FIG._2

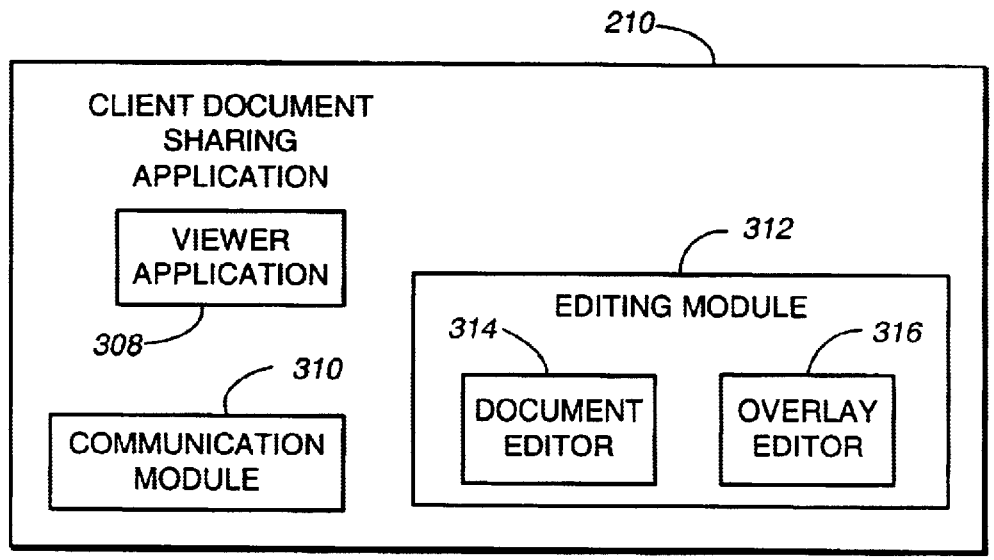
FIG._3
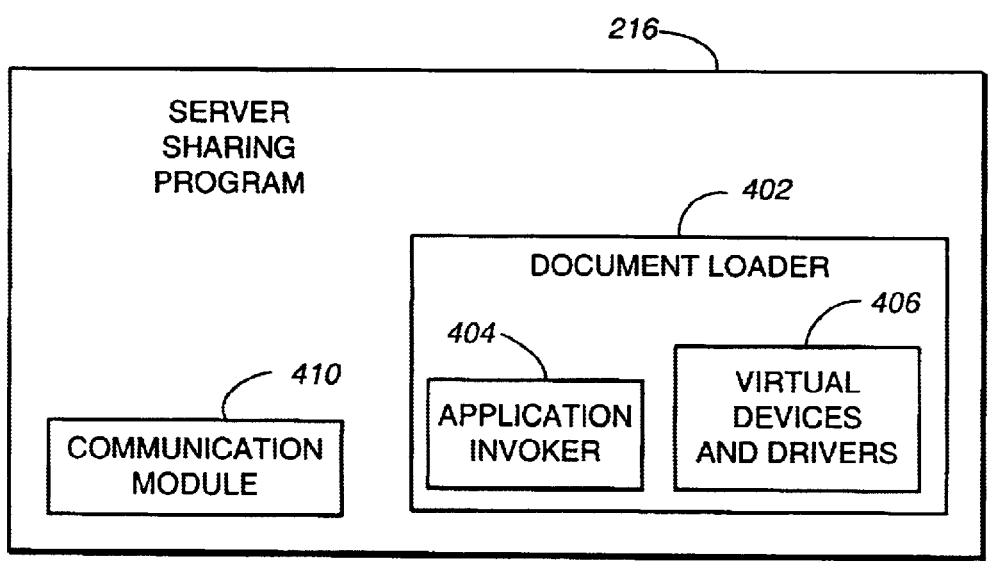
FIG._4

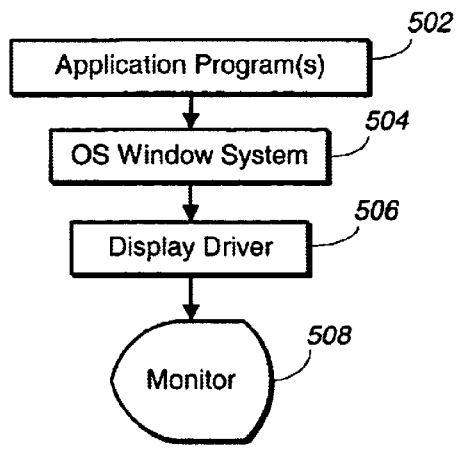
FIG._5
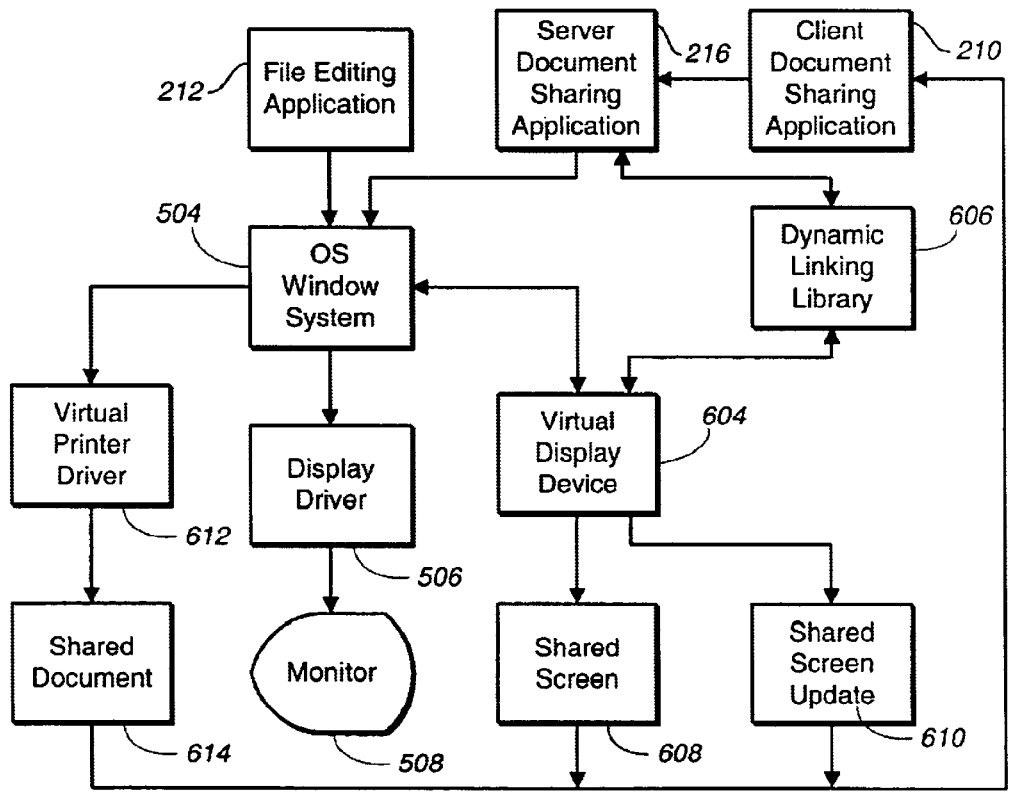
FIG._6

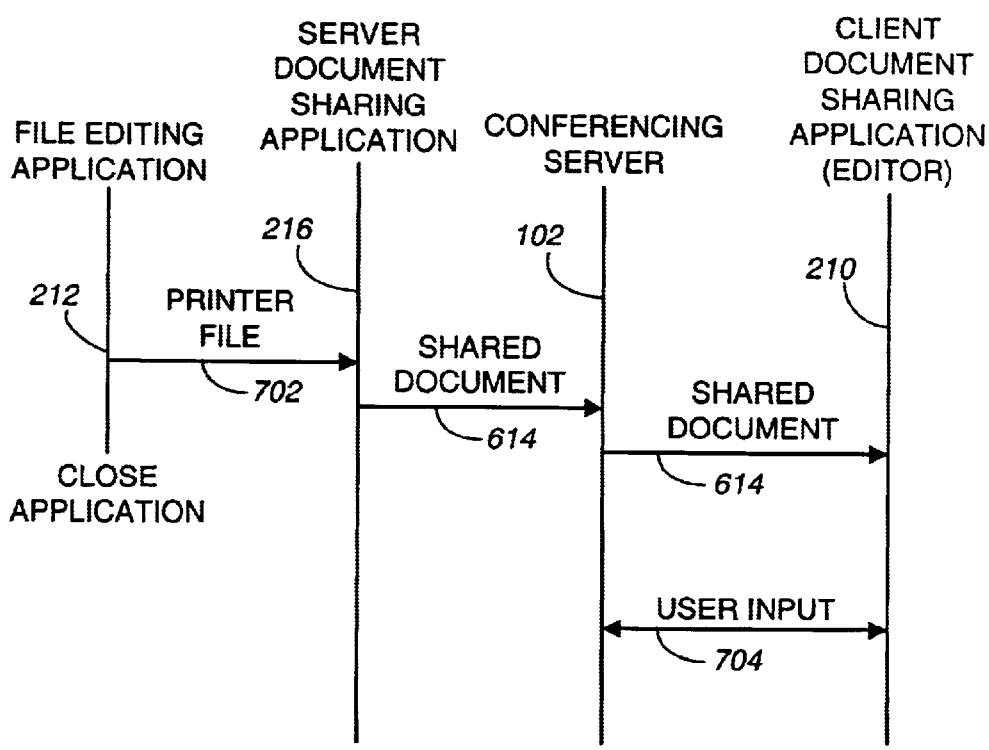
FIG._7

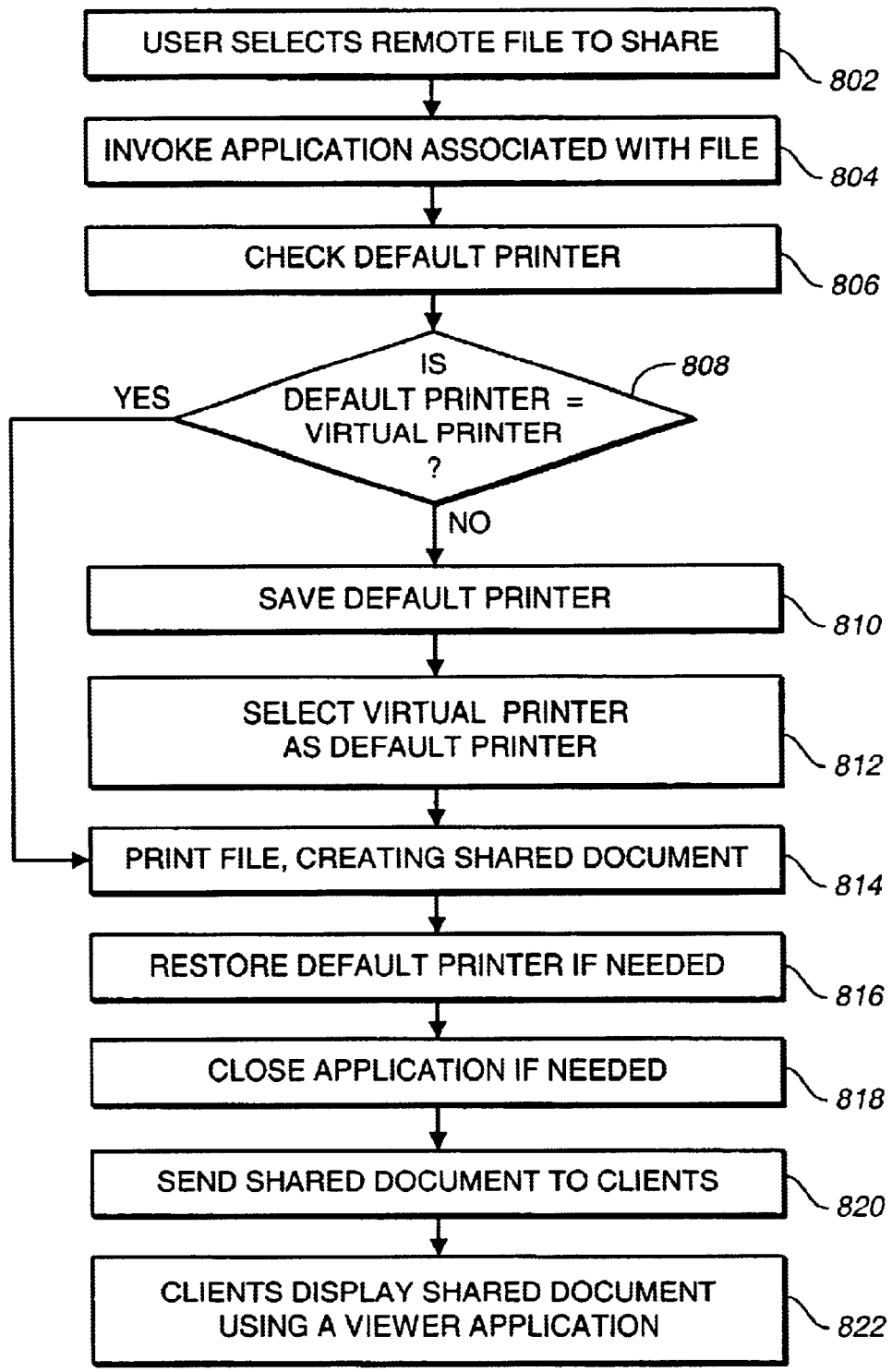
FIG._8

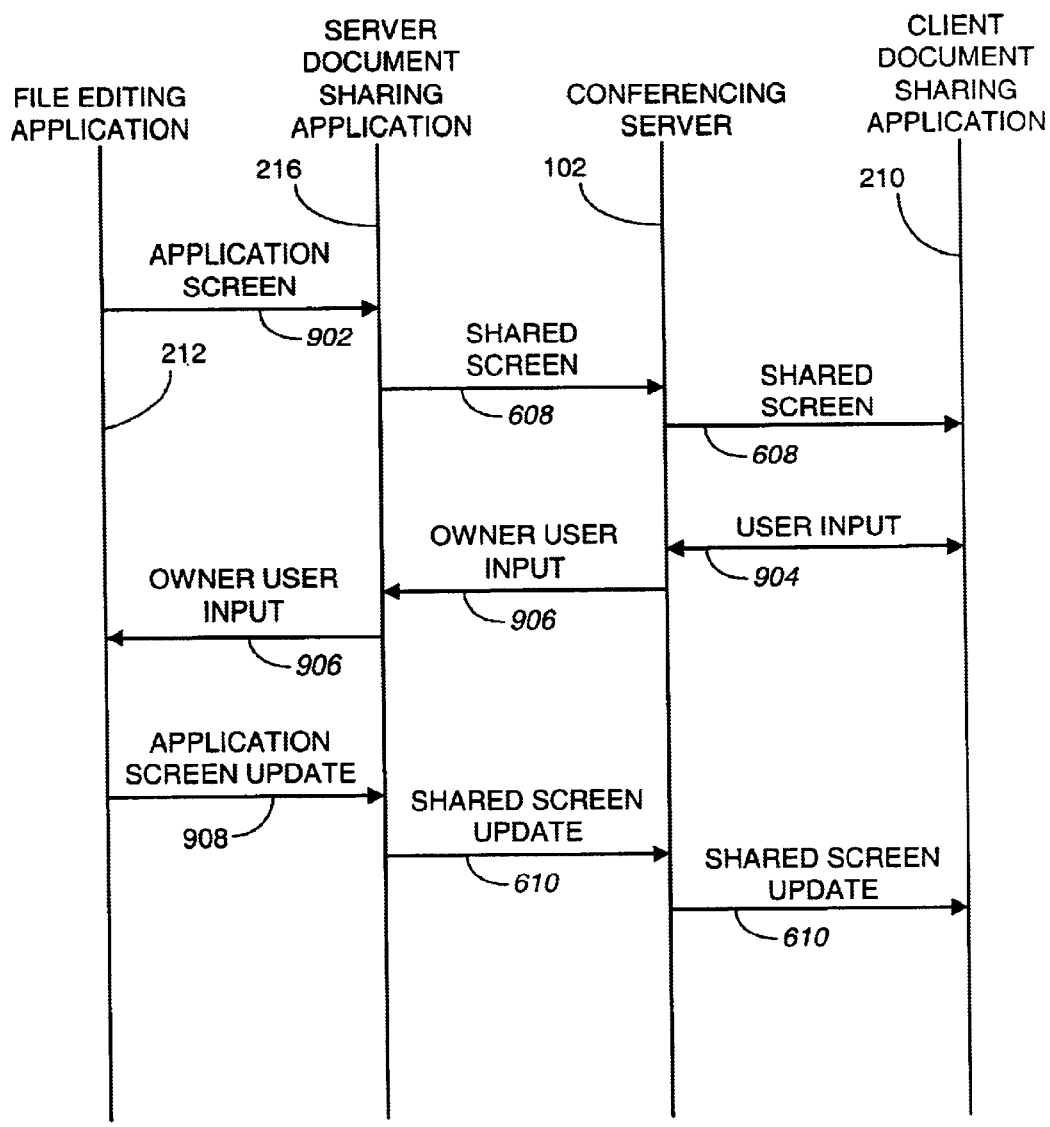
FIG._9

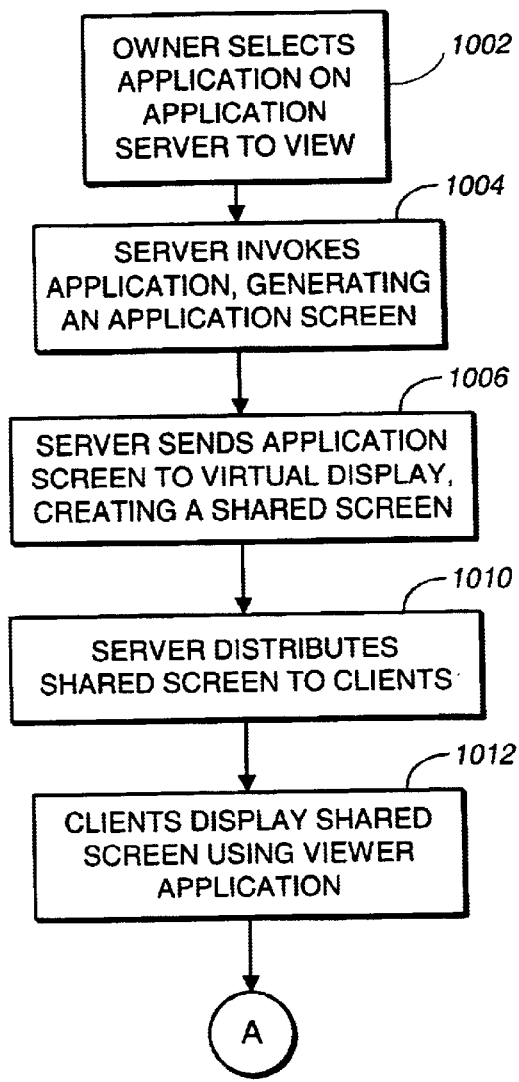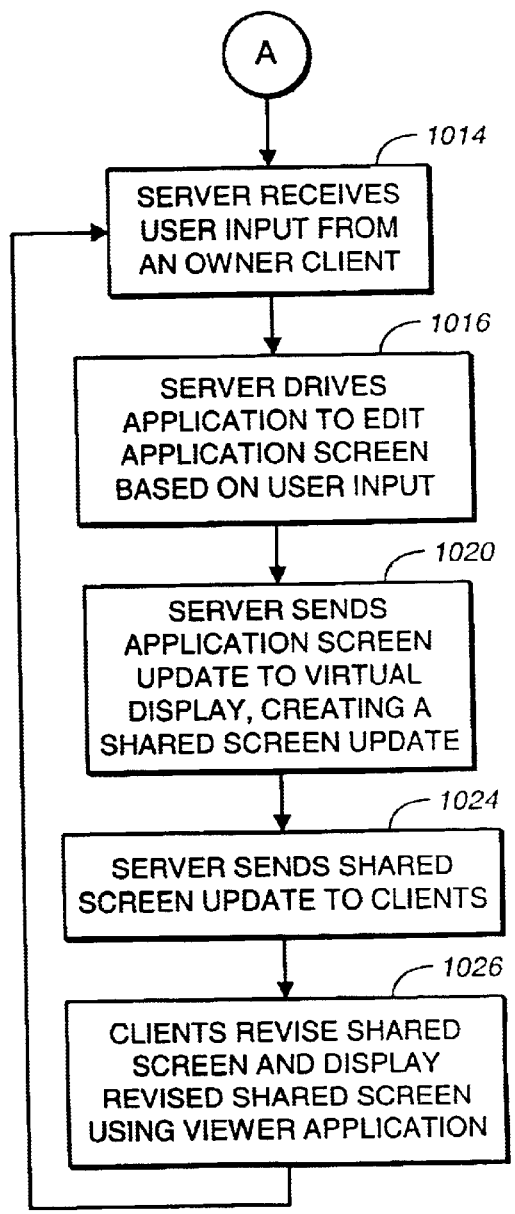
FIG._10A
FIG._10B

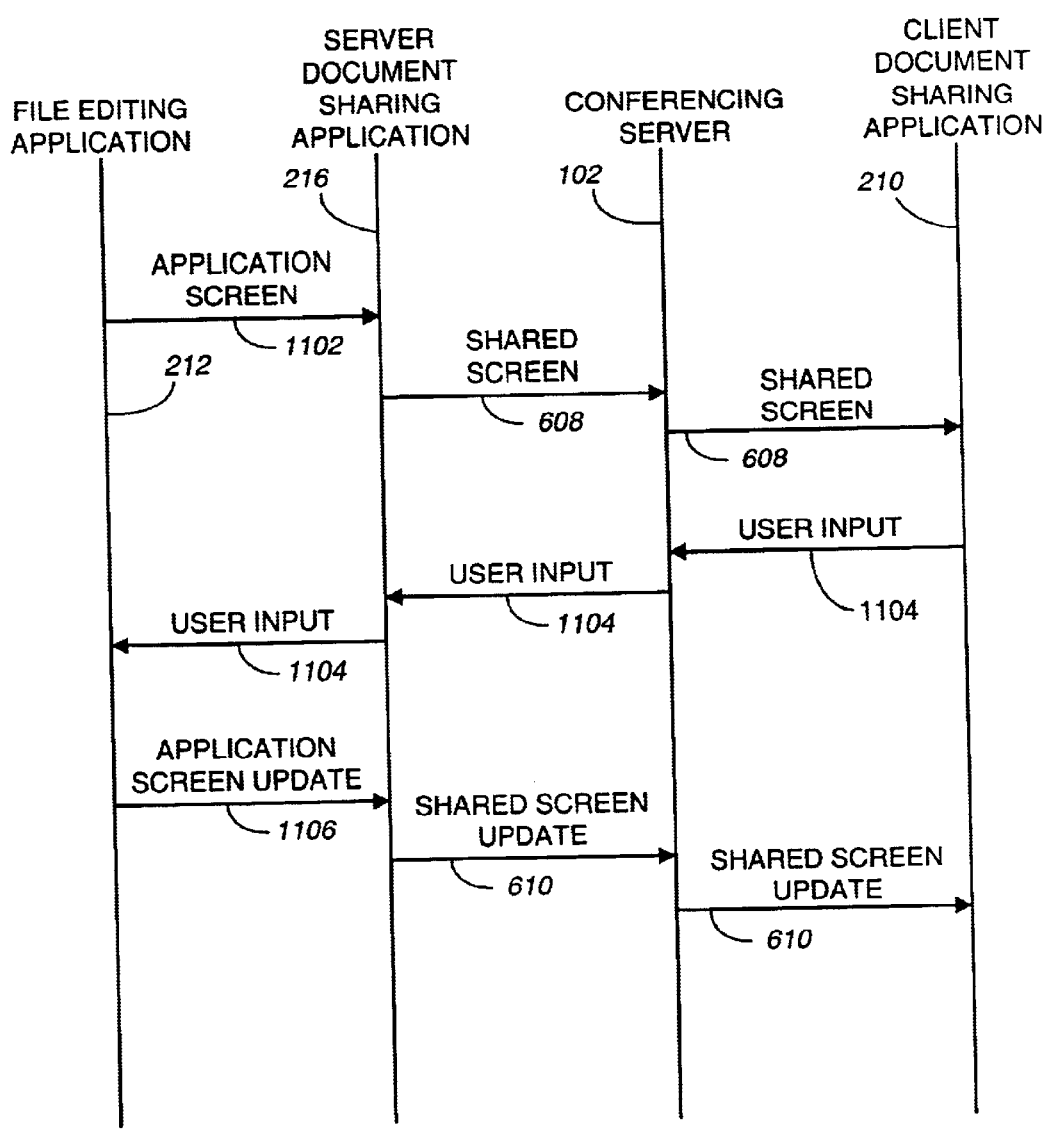
FIG._11

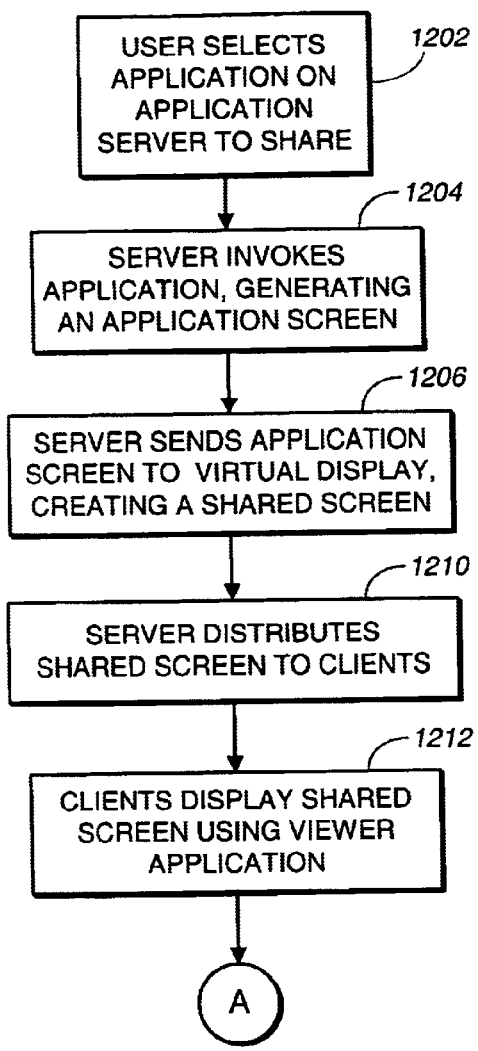
FIG._12A
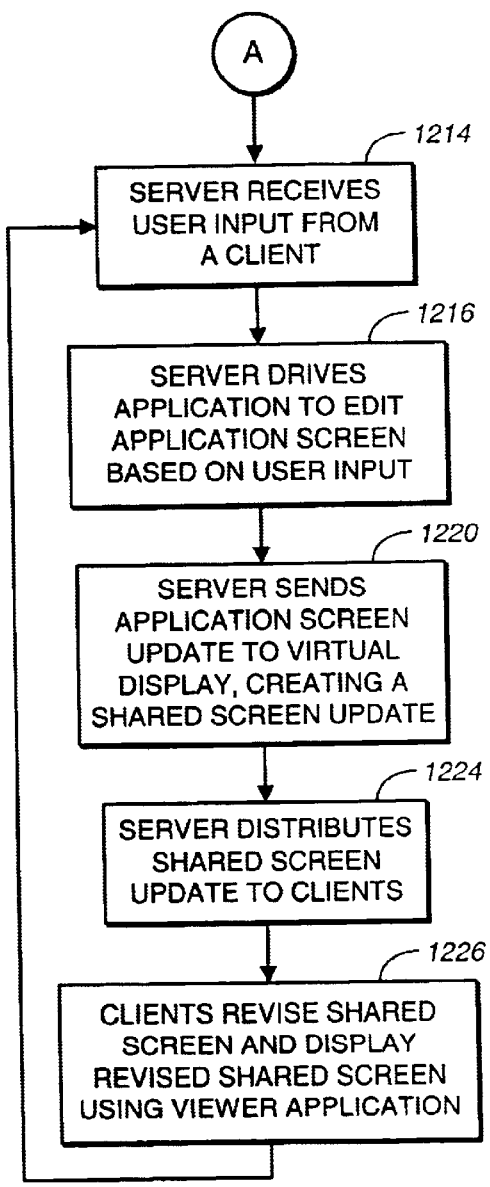
FIG._12B

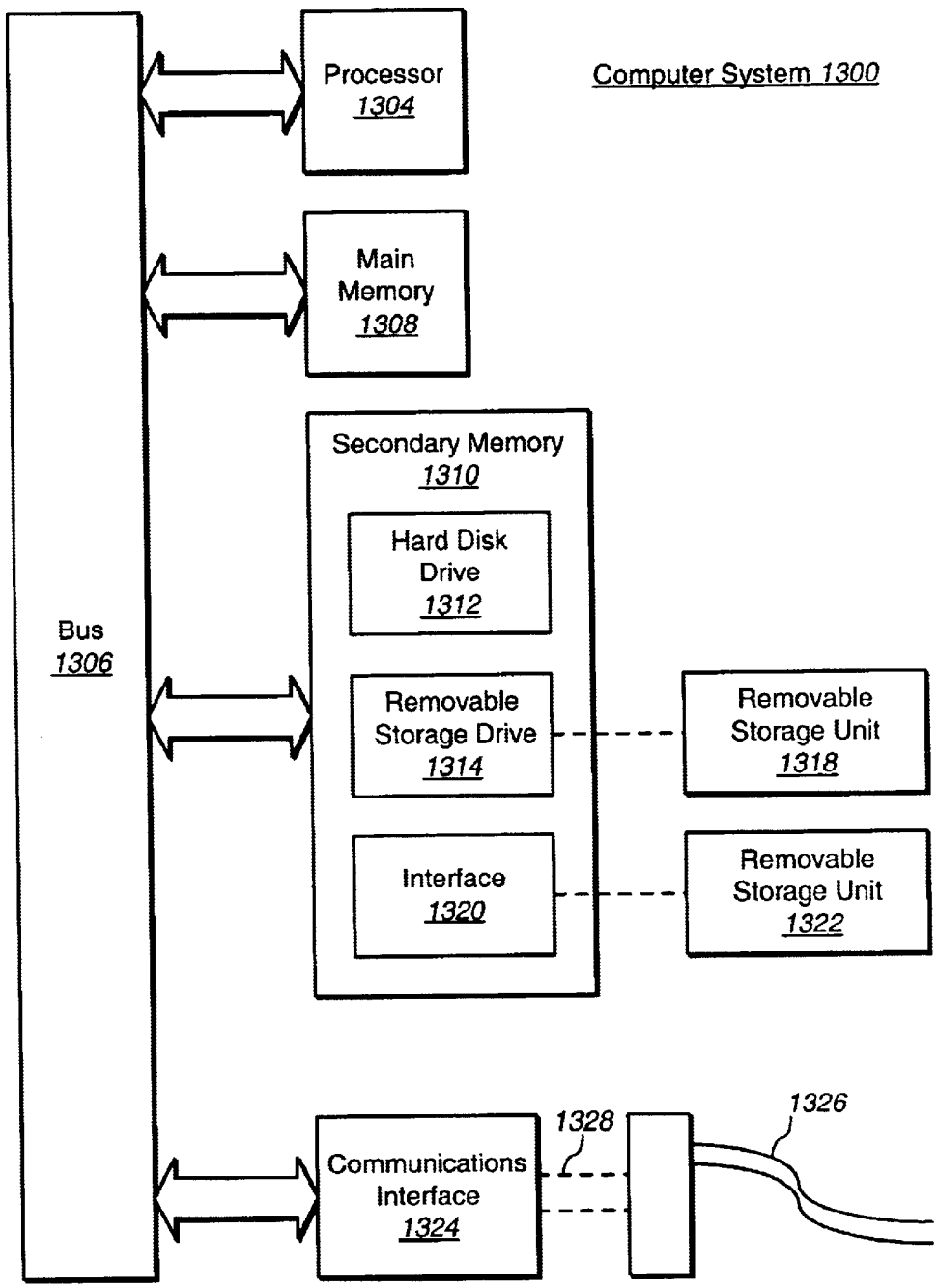
FIG._13

INSTANT SHARING OF DOCUMENTS ON A REMOTE SERVER

BACKGROUND OF THE INVENTION

1. Field of the Invention

The present invention relates generally to data conferencing, and more particularly to instant document sharing in a data conference.

2. Related Art

Whenever two or more people are involved in the viewing, creation or modification of a computer document, whether it be a browser web page, financial spread sheet, a CAD design, a circuit schematic layout, an organization report, a bit map image, and the like, succeeding drafts of the document are prepared, circulated, and modified in the process. Each person works on his or her portion of the document and stores it or forwards a copy to the next person. The next person will subsequently retrieve the stored copy or work on his or her copy of the document. Typically, several drafts of the document will be circulated before a final draft is produced. This is a very time-consuming process.

In the case where the reviewers involved in this document preparation process are at different geographical locations, getting the document from one location to another location and back becomes another tedious and time-consuming task. The document must be mailed or faxed to that person, further complicating the entire process.

An additional complication in many cases is that each person must have a copy of the document editing program required to view, create or modify the document. Examples of such document editing programs include Browsers, spreadsheet applications, word processing programs, image editing programs, and the like. Further, each person must have an identical copy of the document editing program. This scenario not only is expensive in many cases, but also requires additional effort to install, maintain, and update the document editing programs on the user's individual computer systems, referred to here as client computer systems.

One alternative method to this process is to hold meetings where the users gather and comment on the document with the hope to reduce the number of drafts needed before a final draft is produced. The shortcoming with this method is that there may be significant travel time and travel cost in getting everyone to the same location. There may be an additional restriction that the "right" location is constrained to be the location with access to the "correct" document editing program. In addition, the final draft of the document is usually circulated again for final comments.

One solution to this problem is to use a teleconferencing software program to share the document among the geographically dispersed reviewers. This process is often referred to as "data conferencing." By using computer network connections, modem-connected phone lines, and the like, everyone can be connected via his or her computer. By using the teleconferencing software program, everyone's computer screen can display the same document. In addition to using the software program and network or modem connections, conference calling over the voice phone lines or through the software program creates a dynamic and live atmosphere where everyone can participate in the discussion and refer to the document displayed on the screen.

SUMMARY OF THE INVENTION

The present invention is an apparatus, method, and computer program product for instant sharing of a remote document. In one embodiment, referred to as "remote document sharing," a file located on a remote application server is converted to a "shared document" which is distributed to the members of a data conference for review. The method of this embodiment includes printing the file, on the application server, to a virtual printer from an application associated with the file, thereby creating a shared document; and sending the shared document to a plurality of remote clients, whereby the shared document is displayed at each remote client by a viewer application.

In another embodiment, referred to as "remote application sharing," the "owner" of a remote document shares the screens created by an application located on a remote application server, where the document is associated with the application. Each member of the application sharing session can view the screens and interact with the application. The method of this embodiment includes creating a shared screen at a server by sending an application screen generated by an application to a virtual device; sending the shared screen to a plurality of remote clients; presenting, on a display device attached to each of the remote clients, a display of the shared screen; collecting user input from a user at one of the remote clients; sending the user input to the remote server; causing the application at the remote server to edit the application screen based on the user input to produce an application screen update; creating a shared screen update at the remote server by sending the application screen update to the virtual device, wherein the shared screen update represents only the portion of the application screen that was edited; sending the shared screen update to the plurality of remote clients; and revising the display of the shared screen on each display device using the shared screen update.

In another embodiment, referred to as "remote application viewing," the "owner" of a remote document shares the screens created by an application associated with the document. The other members of the data conference can view the screens, but cannot interact with the remote application. Only the owner can interact with the remote application.

In all embodiments, an annotation mode is available, where a transparent window is displayed over the shared document. Users can create objects to be displayed in the transparent window, thereby annotating the document.

One advantage of the present invention is that, by sharing applications in a client-server system, it provides robust, scalable, instant sharing of remote documents.

Another advantage of the present invention is that a document can be shared among clients without distributing the original full-featured document to those clients. Thus a client cannot present a modified copy of the document as an original.

Another advantage of the present invention is that it permits clients to use an application without permitting them to copy that application. Thus, clients can be billed for the use of the application on a per-use basis.

Further features and advantages of the present invention as well as the structure and operation of various embodiments of the present invention are described in detail below with reference to the accompanying drawings.

BRIEF DESCRIPTION OF THE DRAWINGS

The present invention will be described with reference to the accompanying drawings.

FIG. 1 depicts an example client-server system in which the present invention may be used.

FIG. 2 depicts two clients engaged in an application sharing session using a conferencing server and an application server.

FIG. 3 is a block diagram of a client document sharing application according to a preferred embodiment of the present invention.

FIG. 4 is a block diagram of a server document sharing application according to a preferred embodiment of the present invention.

FIG. 5 depicts the software layers in a structured system environment.

FIG. 6 depicts the software layers in a structured system environment as modified by a preferred embodiment of the present invention.

FIG. 7 is a flow diagram depicting the operation of remote document sharing mode according to a preferred embodiment of the present invention.

FIG. 8 is a flowchart depicting the operation of remote document sharing mode according to a preferred embodiment of the present invention.

FIG. 9 is a flow diagram depicting the operation of remote application viewing mode according to a preferred embodiment of the present invention.

FIGS. 10A and 10B constitute a flowchart depicting the operation of remote application viewing mode according to a preferred embodiment of the present invention.

FIG. 11 is a flow diagram depicting the operation of remote application sharing mode according to a preferred embodiment of the present invention.

FIGS. 12A and 12B constitute a flowchart depicting the operation of remote application sharing mode according to a preferred embodiment of the present invention.

FIG. 13 depicts an example computer system capable of carrying out the functionality of the present invention.

DESCRIPTION OF THE PREFERRED EMBODIMENTS

The present invention is described in terms of the above example. This is for convenience only and is not intended to limit the application of the present invention. In fact, after reading the following description, it will be apparent to one skilled in the relevant art how to implement the present invention in alternative embodiments.

Introduction

The present invention is an apparatus, method, and computer program product for sharing server-hosted applications in a client-server system having multiple remote clients. FIG. 1 depicts an example client-server system 100 in which the present invention may be used. System 100 includes a conferencing server 102, an application server 106 and a plurality of clients 104A, 104B, 104N. The present invention is usually invoked after a data conference has been established among the client using the conferencing server. Methods for establishing data conferences among clients are well known in the relevant arts.

The present invention provides four modes to support different kinds of data sharing and collaboration: remote document sharing mode, remote application viewing mode, remote application sharing mode, and annotation mode. In each mode, a remote document is shared among the clients.

In each mode, a client assumes one of four roles: owner, host, editor, and spectator. The owner is the client that controls the remote document. The host is the client that has control of the data conference. An editor is a client that is allowed to edit the remote document. An annotator is a client that can edit a transparent window that overlays the remote document. A spectator is a client that can view the remote document and transparent window, but cannot edit them.

FIG. 2 depicts two clients 204 engaged in a data conference using conferencing server 102 and application server 106. One key advantage of using a client-server architecture rather than a peer-to-peer architecture is that no client is burdened with communicating with all of the other clients. Clients merely communicate with the conferencing server. This advantage permits the system to be highly scalable, for example, to serve a data conference involving a large number of clients.

In the described implementation, a conferencing server 102 serves as the interface between the clients 204 and application server 106. A key advantage of this implementation is the application server communicates only with the conferencing server. This provides advantages in terms of access, maintenance, security, and accounting.

Referring to FIG. 2, each client includes an operating system 206, such as Windows, a memory 208, a browser 214, and a client document sharing application 210. Client 204A has assumed the role of owner. Client 204B has assumed the role of editor. Application server 106 includes an operating system 206, a file editing application 212, and a server document sharing application 216. File editing application 212 is associated with the document to be shared. For example, the file editing application can be Microsoft Word, and the document to be shared can be a Microsoft Word document. As another example, the file editing application can be a browser such as Microsoft Internet Explorer, and the document to be shared can be any web site. For example, geographically dispersed users can use this "co-browsing" feature to shop together online.

FIG. 3 is a block diagram of client document sharing application 210 according to a preferred embodiment of the present invention. In a preferred embodiment, client document sharing application 210 is configured as a browser plug-in that can be downloaded from the Internet and installed on a computer running a Windows-type operating system and a browser such as Windows Internet Explorer.

Client document sharing application 210 includes an application viewer 308, a communication module 310, and an editing module 312. Editing module 312 includes a document editor 314 and an overlay editor 316. The functions of these elements will be described in greater detail below.

FIG. 4 is a block diagram of a server document sharing application 216 according to a preferred embodiment of the present invention. In a preferred embodiment, server document sharing application 216 is a software program executing on a computer running a Windows-type operating system.

In order to share a remote document, document sharing application 216 first converts the document to another form by "loading" the document, as will be discussed in detail below. Therefore, the document sharing application 216 includes document loader 402. Depending on the sharing mode, document loading may involve invoking an application associated with the document. Accordingly, document loader 402 includes an application invoker 404. The present invention also uses virtual devices and drivers in document loading. Accordingly, document loader 402 includes virtual devices and drivers 406. Application server 106 shares a loaded document by transmitting data to other clients, and receiving such data, using communication module 410.

Referring to FIG. 3, when a loaded document is received by a client 204; a viewer a application 308 allows a user to view the document. Methods for exchanging such data are discussed extensively in U.S. Pat. No. 5,623,603, assigned to the assignee of the present application, and the disclosure thereof incorporated herein by reference in its entirety.

Editing module 312 enables users to perform editing functions. Document editor 314 allows users to edit a shared document. Overlay editor 316 allows users to edit the transparent overlay screen. Annotating the transparent window and sending data representing the annotations to a remote computer, where the annotations are drawn on the display, is discussed extensively in U.S. Pat. No. 5,577,188, assigned to the assignee of the present application, and the disclosure thereof incorporated herein by reference in its entirety.

Structured System Programming Environment

Before proceeding to the discussion of the methods of document sharing, the software layers in a structured system programming environment such as Microsoft Windows are explained. Referring to FIGS. 5 and 6, in starting the server document sharing application 216, the software layers in a structured system programming environment are modified.

FIG. 5 depicts the software layers in a conventional structured system environment. In this environment, a running application program 502 interfaces with input and output devices strictly through the operating system's Window system environment, represented by OS Window system 504. When the application program requests the OS Window system to write a character to the screen, the OS Window system in turn directs a display driver 506 to write the character to the monitor 508. A driver such as a display driver is a software program written specifically to handle a specific device or device type, such as monitor 508. For example, there are several standards of display resolution with computer monitors. A display driver is needed for each standard in order to control and interface with each type of monitor.

Display driver 506 tells the monitor 508 specifically how to write a character on the screen. For example, in an application program such as a word processor running on top of OS Window system 504, when the user inputs a character "a" from the keyboard and when the word processor receives the character "a" as input, the word processor will display the character "a" on the screen at the right place to reassure the user that he or she has input a character "a". To write the character "a" to the screen, the word processor calls a OS Window system 504 write-to-screen routine, specifying the character "a" and the location on the screen to place the character. The OS Window system 504 routine in turn calls the display driver with the given information, and the display driver specifically tells the computer screen the placement of dots on the screen to compose the visual image resembling the character "a".

In activating server document sharing application 216, referring to FIG. 6, the software layer structure is modified. The application call to OS Window system 504 is redirected to a virtual display device 604. Virtual display device 604 is one of the virtual devices and drivers 406 within document loader 402.

In a preferred embodiment, redirection of the application calls to OS Window system is accomplished by renaming the appropriate OS Window System calls with predefined alternate calls and naming the virtual display device to the OS Window system's original calls. When the application calls the OS Window System via its name, it is calling the virtual display device rather than the OS Window System. The virtual display device calls the OS Window system through its predefined names. The virtual display device calls the OS Window system with the information to place on the screen as requested by a file editing application 212, which can be any application such as a word processor.

In one embodiment, virtual display driver 604 reports the screen updates to server document sharing application 216 via dynamic link library 606. When the screen updates are finished, server document sharing application 216 reads the screen updates stored in dynamic link library 606. In annotation mode, client document sharing application 210 checks for overlapping screen objects and re-draws the annotation objects if necessary. This process is fully explained in U.S. Pat. No. 5,577,188.

In another embodiment, server document sharing application 216 creates a shared screen 608, or a shared screen update 610, which is passed directly (via conferencing server 102) to document sharing application 210 for display, and for transmission to other clients in the data conference for display to other users. This embodiment is used in the application viewing and application sharing modes, as described in detail below.

In document sharing mode, a representation of the entire document is sent to each client's viewer application 308. In one embodiment, this is accomplished by using a virtual printer driver 612. The document to be shared is printed from its associated file editing application 212 to virtual printer driver 612, creating a shared document 614 in a predefined format. Shared document 614 is passed directly to client document sharing application 210 for display, and for transmission to other clients in the data conference for display to other users.

Remote Document Sharing Mode

FIG. 7 is a flow diagram depicting the operation of document sharing mode according to a preferred embodiment of the present invention. FIG. 7 depicts the data flows between file editing application 212, server document sharing application 216 running on application server 106 and client document sharing application 210 running on client 204. FIG. 8 is a flowchart depicting this operation.

Referring to FIG. 8, the user of owner client 204A selects a remote file to share in step 802. In response, the application invoker of server document sharing application 216 invokes the file editing application 212 associated with the selected file in step 804. In a preferred embodiment, the application invoker employs automatic application association to select the associated file editing application based on associations established by the operating system according to methods well-known in the relevant arts. If the file editing application is already running, step 804 merely involves opening the selected file using the associated file editing application. However, if the file editing application is not open when the file is selected, the file editing application is launched first.

The default printer associated with file editing application 212 or Windows is checked in step 806. If the default printer is not set to be the virtual printer associated with virtual printer driver 612, then the default printer is saved in step 810 and the virtual printer is selected as the default printer in step 812. Otherwise, steps 810 and 812 are skipped.

The selected file is then printed to the virtual printer in step 814. Referring to FIG. 6, this operation entails redirecting the print call from file editing application 212 at the OS Window System 504 to virtual printer driver 612, thereby creating shared document 614. Shared document 614 is then passed to client document sharing application 210 for viewing and distribution. If necessary, the default printer is restored in step 816. If file editing application 212 was launched in step 804, then it is closed in step 818.

Client document sharing application 210, on receipt of shared document 614, sends the shared document to server 102 for distribution to all clients in the data conference. All of the clients in the data conference then display the shared document using a viewer application 308, as shown in step 822.

In FIG. 7, time flows from top to bottom. Referring to that figure, virtual printer driver 612 generates printer file 702 which is modified by server document sharing application 216 to create a shared document 614. Server document sharing application 216 forwards it to conferencing server 102 for distribution to client document sharing applications 210 for display. Using annotation mode, the client document sharing applications 210 can exchange user input 704 through conferencing server 102 to draw various objects upon a transparent window overlaying the shared document 614.

Remote Application Viewing Mode

FIG. 9 is a flow diagram depicting the operation of remote application viewing mode according to a preferred embodiment of the present invention. FIGS. 10A and 10B constitute a flowchart depicting that operation.

A user of a client document sharing application 210 selects a file editing application to view in step 1002. In response, the file editing application is invoked, generating an application screen 902, as shown in step 1004. Server document sharing application 216 causes application screen 902 to be sent to virtual display driver 604, thereby generating a shared screen 608 as shown in step 1006. Server 102 distributes the shared screen to the clients in the data conference in step 1010. In step 1012, the clients in the data conference, running client document sharing application 210, display the shared screen using viewer application 308.

Referring to FIG. 9, the users in the data conference that have been granted the role of editor can exchange user input in the form of annotations 904. However, in application viewing mode, the remote application is controlled only by the owner's user input 906. in one implementation, conferencing server 102 authenticates the owner using well-known conventional methods.

The other clients in the data conference are not permitted to control the application directly. When client document sharing application 210 receives input from the owner in step 1014, it forwards this user input 906 to file editing application 602 via conferencing server 102 and server document sharing application 216 to drive the application to edit the application screen based on that input, as shown in step 1016. In response, the application provides an application screen update 908. Server document sharing application 216 sends application screen update 908 to virtual display driver 604, thereby creating a shared screen update 610, as shown in step 1020.

Server document sharing application 216 forwards the shared screen update to conferencing server 102. The server distributes the shared screen update to the clients in the data conference, as shown in step 1024. In response, the clients revise the shared screen currently being displayed using the shared screen update, and display the revised shared screen in step 1026.

Remote Application Sharing Mode

FIG. 11 is a flow diagram depicting the operation of application sharing mode according to a preferred embodiment of the present invention. FIGS. 12A and 12B constitute a flowchart depicting that operation.

The owner of client document sharing application 210 selects a remote application to view in step 1202. In response, the file editing application is invoked, generating an application screen 1102, as shown in step 1204. Server document sharing application 216 causes application screen 1102 to be sent to virtual display driver 604, thereby generating a shared screen 608 as shown in step 1206. Server 102 distributes the shared screen to the clients in the data conference in step 1210. In step 1212, the clients in the data conference display the shared screen using viewer application 308.

In application sharing mode, both the owner and editors are permitted to control the file editing application directly. Steps 1214 through 1226 illustrate this process. Referring to FIG. 11, a user of client document sharing application 210 generates editor user input 1104, which is sent to server document sharing application 216 through conferencing server 102. Server document sharing application 216 receives the editor user input in step 1214, and forwards this input to file editing application 212, thereby driving that application to edit the current application screen based on editor user input 1104 as shown in step 1216. Server document sharing application 216 sends the application screen update to virtual display driver 604, thereby creating a shared screen update 610, as shown in step 1220.

Server distributes the shared screen update to all the clients in the data conference using conferencing server 102, as shown in step 1224. Each client revises the current shared screen using the shared screen update, and displays the revised shared screen using its viewer application 308, as shown in step 1226. The process of steps 1214 through 1226 is repeated as needed.

Exemplary Computer System

The present invention may be implemented using hardware, software or a combination thereof and may be implemented in a computer system or other processing system. In fact, in one implementation, the invention is directed toward one or more computer systems capable of carrying out the functionality described herein. An exemplary computer system 1300 is shown in FIG. 13. The computer system 1300 includes one or more processors, such as processor 1304. The processor 1304 is connected to a communication bus 1306. Various software implementations are described in terms of this exemplary computer system. After reading this description, it will become apparent to a person skilled in the relevant art how to implement the invention using other computer systems and/or computer architectures.

Computer system 1300 also includes a main memory 1308, preferably random access memory (RAM), and can also include a secondary memory 1310. The secondary memory 1310 can include, for example, a hard disk drive 1312 and/or a removable storage drive 1314, representing a floppy disk drive, a magnetic tape drive, an optical disk drive, etc. The removable storage drive 1314 reads from and/or writes to a removable storage unit 1318 in a well known manner. Removable storage unit 1318, represents a floppy disk, magnetic tape, optical disk, etc. which is read by and written to by removable storage drive 1314. As will be appreciated, the removable storage unit 1318 includes a computer usable storage medium having stored therein computer software and/or data.

In alternative implementations, secondary memory 1310 may include other similar means for allowing computer programs or other instructions to be loaded into computer system 1300. Such means can include, for example, a removable storage unit 1322 and an interface 1320. Examples of such include a program cartridge and cartridge interface (such as that found in video game devices), a removable memory chip (such as an EPROM, or PROM) and associated socket, and other removable storage units 1322 and interfaces 1320 which allow software and data to be transferred from the removable storage unit 1318 to computer system 1300.

Computer system 1300 can also include a communications interface 1324. Communications interface 1324 allows software and data to be transferred between computer system 1300 and external devices. Examples of communications interface 1324 can include a modem, a network interface (such as an Ethernet card), a communications port, a PCMCIA slot and card, etc. Software and data transferred via communications interface 1324 are in the form of signals which can be electronic, electromagnetic, optical or other signals capable of being received by communications interface 1324. These signals 1326 are provided to communications interface 1324 via a channel 1328. This channel 1328 carries signals 1326 and can be implemented using wire or cable, fiber optics, a phone line, a cellular phone link, an RF link and other communications channels.

In this document, the terms "computer program medium" and "computer usable medium" are used to generally refer to media such as removable storage device 1318, a hard disk installed in hard disk drive 1312, and signals 1326. These computer program products are means for providing software to computer system 1300.

Computer programs (also called computer control logic) are stored in main memory 1308 and/or secondary memory 1310. Computer programs can also be received via communications interface 1324. Such computer programs, when executed, enable the computer system 1300 to perform the features of the present invention as discussed herein. In particular, the computer programs, when executed, enable the processor 1304 to perform the features of the present invention. Accordingly, such computer programs represent controllers of the computer system 1300.

In an implementation where the invention is implemented using software, the software may be stored in a computer program product and loaded into computer system 1300 using removable storage drive 1314, hard drive 1312 or communications interface 1324. The control logic (software), when executed by the processor 1304, causes the processor 1304 to perform the functions of the invention as described herein.

In another implementation, the invention is implemented primarily in hardware using, for example, hardware components such as application specific integrated circuits (ASICs). Implementation of the hardware state machine so as to perform the functions described herein will be apparent to persons skilled in the relevant art(s). In yet another implementation, the invention is implemented using a combination of both hardware and software.

While various embodiments of the present invention have been described above, it should be understood that they have been presented by way of example, and not limitation. It will be apparent to persons skilled in the relevant art that various changes in form and detail can be placed therein without departing from the spirit and scope of the invention. Thus the present invention should not be limited by any of the above-described example embodiments, but should be defined only in accordance with the following claims and their equivalents.

What is claimed is:

1. An apparatus for automatically sharing a file, comprising:

a document loader configured to print a file, on an application server, to a virtual printer from an application associated with the file, the virtual printer to create a shared document for use in a live data conference;

a communication module configured to send the shared document to a conferencing server, the conferencing server to distribute the shared document to a plurality of remote clients; and each of the remote clients having a viewer application to simultaneously display the shared document during the live data conference.

2. The apparatus of claim 1, wherein:

the conferencing server is configured to receive data representing a user-defined object and a user-specified position from one of the remote clients, the user-specified position indicating the position of the user-defined object within a transparent window, the transparent window appearing to be displayed over the shared document, and distribute the data representing the user-defined object and the user-specified position to each of the rest of the remote clients, each of the rest of the remote clients to display the user-defined object at the user-specified position within a transparent window, the transparent window appearing to be displayed over the shared document.

3. A apparatus for use in a client, comprising:

a client document sharing application configured to receive a shared document for use in a live data conference from a conferencing server, the shared document created at a remote server by printing a file to a virtual printer from an application associated with the file; and a viewer application configured to display the shared document at the client, wherein the shared document can be simultaneously displayed by the viewer application and one or more further viewer applications at corresponding further remote clients during the live data conference, and wherein the further remote clients receive the shared document from the conferencing server.

4. The apparatus of claim 3, further comprising:

an overlay editor configured to create a transparent window appearing to be displayed over the shared document and to create a user-defined object, wherein the viewer application is further configured to display the user-defined object at a user-specified position within the transparent window.

5. The apparatus of claim 4, further comprising:

a communication module configured to send data representing the user-defined object and user-specified position to a further client, the further client having a further viewer application to display the user-defined object at the user-specified position within a further transparent window at the client, the further transparent window appearing to be displayed over the shared document.

6. The apparatus of claim 5, wherein:

the communication module is further configure to receive, through the conferencing server, data representing a further user-defined object and a further user-specified position originating from the further client; and the viewer application is further configured to display the further user-defined object at the further user-specified position within the transparent window, the transparent window appearing to be displayed over the shared document.

7. A apparatus for use in a server, comprising:
an application invoker configured to invoke an application to produce an application screen;
a server document sharing application configured to send the application screen to a virtual device, the virtual device to produce a shared screen for use in a live data conference;
a communication module configured to send the shared screen to a conferencing server, the conferencing server to distribute the shared screen to a plurality of remote clients, each of the remote clients having a viewer application to display the shared screen, the shared screen being simultaneously displayed by each of the viewer applications during the live data conference; and
a file editing application configured to receive user input from one of the remote clients and drive the application to edit the application screen based on the user input to produce an application screen update,
wherein the server document sharing application is further configured to receive the application screen update from the application and send the application screen update to the virtual device, the virtual device to create a shared screen update, the shared screen update representing only the portion of the application screen that was edited, and
wherein the communication module is further configured to send the shared screen update to the conferencing server, the conferencing server to distribute the shared screen update to the remote clients, each of the viewer applications to update the display of the application screen with the shared screen update, the shared screen update being simultaneously displayed by each of the viewer applications during the live data conference.

8. The apparatus of claim 7, wherein:
the server document sharing application is further configured to replace the default device driver with a virtual device driver associated with the virtual device.

9. An apparatus for use in a client for sharing a file located at a remote server, the apparatus comprising:
a client document sharing application configured to receive a shared screen for use in a live data conference from a conferencing server, the shared screen created at a remote server by sending an application screen to a virtual device from an application associated with the file; and
a viewer application configured to display the shared screen at the client, wherein the shared screen can be simultaneously displayed by the viewer application and one or more further viewer applications at corresponding further remote clients during the live data conference, and wherein the further remote clients receive the shared screen from the conferencing server.

10. The apparatus of claim 9, wherein:
the client document sharing application is further configured to receive user input from a user; and
the apparatus further comprises a communication module configured to send the user input to the conferencing server, the conferencing server to send the user input to a file editing application at the remote server, the file editing application to drive the application to edit the application screen based on the user input to produce an application screen update.

11. The apparatus of claim 10, wherein:
the communication module is further configured to receive a shared screen update, the shared screen update created at the remote server by sending the application screen update to the virtual device from the application; and
the viewer application is further configured to update the display of the shared screen with the shared screen update, wherein the shared screen update can be simultaneously displayed by the viewer application and one or more of the further viewer applications at corresponding further remote clients during the live data conference.

12. The apparatus of claim 11, wherein the shared screen update represents only the portion of the application screen that was edited.

13. The apparatus of claim 12, further comprising:
a display device attached to the client, the display device to present a display of the shared screen.

14. The apparatus of claim 13, wherein:
the viewer application is further configured to revise the display of the shared screen on the display device using the shared screen update.

15. An apparatus, comprising:
a server document sharing application configured to send an application screen generated by an application to a virtual device, the virtual device to create a shared screen for use in a live data conference, the shared screen being created at a server;
a server communication module configured to send the shared screen to a conferencing server, the conferencing server to distribute the shared screen to a plurality of remote clients;
a display device attached to each of the remote clients, each of the display devices to simultaneously present a display of the shared screen during the live data conference;
a client document sharing application to collect user input from a user at one of the remote clients;
a client communication module configured to send the user input to the conferencing server, the conferencing server to send the user input to the server; and
an application invoker to a file editing application at the remote server to edit the application screen based on the user input to produce an application screen update, the server document sharing application to send the application screen update to the virtual device, the virtual device to create a shared screen update at the server, wherein the shared screen update represents only the portion of the application screen that was edited,
wherein the server communication module is further configured to send the shared screen update to the conferencing server, the conferencing server to distribute the shared screen update to the plurality of remote clients, and
wherein a viewer application revises the display of the shared screen on each display device using the shared screen update.

16. A method for automatically sharing a file, comprising:
printing a file, on an application server, to a virtual printer from an application associated with the file, the virtual printer to create a shared document for use in a live data conference; and
sending the shared document to a conferencing server, the conferencing server to distribute the shared document to a plurality of remote clients; and displaying the shared document at each remote client with a viewer application, wherein the shared document can be simultaneously displayed by each of the viewer applications during the live data conference.

17. The method of claim 16, further comprising:

receiving data representing a user-defined object and a user-specified position from one of the remote clients, the user-specified position indicating the position of the user-defined object within a transparent window, the transparent window appearing to be displayed over the shared document; and distributing the data representing the user-defined object and the user-specified position to each of the rest of the remote clients, each of the rest of the remote clients to display the user-defined object at the user-specified position within a transparent window, the transparent window appearing to be displayed over the shared document.

18. A method for use in a client, comprising:

receiving a shared document for use in a live data conference from a conferencing server, the shared document created at a remote server by printing a file to a virtual printer from an application associated with the file; and displaying the shared document using a viewer application at the client, wherein the shared document can be simultaneously displayed by the viewer application and one or more further viewer applications at corresponding further remote clients during the live data conference, and wherein the further remote clients receive the shared document from the conferencing server.

19. The method of claim 18, further comprising:

creating a transparent window appearing to be displayed over the shared document;

creating a user-defined object; and displaying the user-defined object at a user-specified position within the transparent window.

20. The method of claim 19, further comprising:

sending data representing the user-defined object and user-specified position to the conferencing server, the conferencing server to send the data representing the user-defined object and user-specified position to a further client, and displaying the user-defined object at the user-specified position within a further transparent window at the further client, the further transparent window appearing to be displayed over the shared document.

21. The method of claim 20, further comprising:

receiving, through the conferencing server, data representing a further user-defined object and a further user-specified position originating from the further client; and displaying the further user-defined object at the further user-specified position within the transparent window, the transparent window appearing to be displayed over the shared document.

22. A method for use in a server, comprising:

invoking an application to produce an application screen;

sending the application screen to a virtual device to produce a shared screen for use in a live data conference;

sending the shared screen to a conferencing server, the conferencing server to distribute the shared screen to a plurality of remote clients;

displaying the shared screen at each of the remote clients with a corresponding viewer application;

receiving user input from one of the remote clients;

driving the application to edit the application screen based on the user input to produce an application screen update;

sending the application screen update to the virtual device, the virtual device to create a shared screen update, the shared screen update representing only the portion of the application screen that was edited; and sending the shared screen update to the conferencing server, the conferencing server to distribute the shared screen update to the remote clients, and updating the display of the application screen with the shared screen update, the shared screen update being simultaneously displayed by each of the viewer applications during the live data conference.

23. The method of claim 22, further comprising:

replacing the default device driver with a virtual device driver associated with the virtual device.

24. A method for use in a client for sharing a file located at a remote server, the method comprising:

receiving a shared screen for use in a live data conference from a conferencing server, the shared screen created at a remote server by sending an application screen to a virtual device from an application associated with the file; and displaying the shared screen using a viewer application at the client, wherein the shared screen can be simultaneously displayed by the viewer application and one or more further viewer applications at corresponding further remote clients during the live data conference, and wherein the further remote clients receive the shared screen from the conferencing server.

25. The method of claim 24, further comprising:

receiving user input from a user;

sending the user input to the conferencing server, the conferencing server to send the user input to the remote server; and driving the application to edit the application screen based on the user input to produce an application screen update.

26. The method of claim 25, further comprising:

receiving a shared screen update from the conferencing server, the shared screen created at the remote server by sending the application screen update to the virtual device from the application; and updating the display of the shared screen with the shared screen update, wherein the shared screen update can be simultaneously displayed by the viewer application and one or more of the further viewer applications at corresponding further remote clients during the live data conference.

27. The method of claim 26, wherein the shared screen update represents only the portion of the application screen that was edited.

28. The method of claim 27, further comprising:

presenting a display of the shared screen on a display device attached to the client.

29. The method of claim 28, further comprising:

revising the display of the shared screen on the display device using the shared screen update.

30. A method, comprising:

creating a shared screen for use in a live data conference, the shared screen being created at a server by sending an application screen generated by an application to a virtual device;

sending the shared screen to a conferencing server, the conferencing server to distribute the shared screen to a plurality of remote clients;

simultaneously presenting, on a display device attached to each of the remote clients, a display of the shared screen during the live data conference;

collecting user input from a user at one of the remote clients;

sending the user input to the conferencing server, the conferencing server to send the user input to the remote server;

causing the application at the remote server to edit the application screen based on the user input to produce an application screen update;

creating a shared screen update at the remote server by sending the application screen update to the virtual device, wherein the shared screen update represents only the portion of the application screen that was edited;

sending the shared screen update to the conferencing server, the conferencing server to distribute the shared screen update to the plurality of remote clients; and revising the display of the shared screen on each display device using the shared screen update.

31. A computer program automatically sharing a file, the computer program tangibly stored on a computer-readable medium, containing instructions for causing a computer to:

print a file, on an application server, to a virtual printer from an application associated with the file, the virtual printer to create a shared document for use in a live data conference; and send the shared document to a conferencing server, the conferencing server to distribute the shared document to a plurality of remote clients; and displaying the shared document at each remote client with a viewer application, wherein the shared document can be simultaneously displayed by each of the viewer applications during the live data conference.

32. The computer program of claim 31, further including instructions for causing a computer to:

receive data representing a user-defined object and a user-specified position from one of the remote clients, the user-specified position indicating the position of the user-defined object within a transparent window, the transparent window appearing to be displayed over the shared document; and distribute the data representing the user-defined object and the user-specified position to each of the rest of the remote clients, each of the rest of the remote clients to display the user-defined object at the user-specified position within a transparent window, the transparent window appearing to be displayed over the shared document.

33. A computer program for use in a client, the computer program tangibly stored on a computer-readable medium, containing instructions for causing a computer to:

receive a shared document for use in a live data conference from a conferencing server, the shared document created at a remote server by printing a file to a virtual printer from an application associated with the file; and display the shared document using a viewer application at the client, wherein the shared document can be simultaneously displayed by the viewer application and one or more further viewer applications at corresponding further remote clients during the live data conference, and wherein the further remote clients receive the shared document from the conferencing server.

34. The computer program of claim 33, further including instructions for causing a computer to:

create a transparent window appearing to be displayed over the shared document;

create a user-defined object; and display the user-defined object at a user-specified position within the transparent window.

35. The computer program of claim 34, further including instructions for causing a computer to:

send data representing the user-defined object and user-specified position to the conferencing server, the conferencing server to send the data representing the user-defined object and user-specified position to a further client, and displaying the user-defined object at the user-specified position within a further transparent window at the further client, the further transparent window appearing to be displayed over the shared document.

36. The computer program of claim 35, further including instructions for causing a computer to:

receive, through the conferencing server, data representing a further user-defined object and a further user-specified position originating from the further client; and display the further user-defined object at the further user-specified position within the transparent window, the transparent window appearing to be displayed over the shared document.

37. A computer program for use in a server, the computer program tangibly stored on a computer-readable medium, containing instructions for causing a computer to:

invoke an application to produce an application screen; send the application screen to a virtual device to produce a shared screen for use in a live data conference;

send the shared screen to a conferencing server, the conferencing server to distribute the shared screen to a plurality of remote clients;

display the shared screen at each of the remote clients with a corresponding viewer application;

receive user input from one of the remote clients;

drive the application to edit the application screen based on the user input to produce an application screen update;

send the application screen update to the virtual device, the virtual device to create a shared screen update, the shared screen update representing only the portion of the application screen that was edited; and send the shared screen update to the conferencing server, the conferencing server to distribute the shared screen update to the remote clients; and update the display of the application screen with the shared screen update, the shared screen update being simultaneously displayed by each of the viewer applications during the live data conference.

38. The computer program of claim 37, further including instructions for causing a computer to:

replace the default device driver with a virtual device driver associated with the virtual device.

39. A computer program for use in a client for sharing a file located at a remote server, the computer program tangibly stored on a computer-readable medium, containing instructions for causing a computer to:

receive a shared screen for use in a live data conference from a conferencing server, the shared screen created at a remote server by sending an application screen to a virtual device from an application associated with the file; and display the shared screen using a viewer application at the client, wherein the shared screen is simultaneously displayable by the viewer application and one or more further viewer applications at corresponding further remote clients during the live data conference, and wherein the further remote clients receive the shared screen from the conferencing server.

40. The computer program of claim 39, further including instructions for causing a computer to:

receive user input from a user;

send the user input to the conferencing server, the conferencing server to send the user input to the remote server; and drive the application to edit the application screen based on the user input to produce an application screen update.

41. The computer program of claim 40, further including instructions for causing a computer to:

receive a shared screen update from the conferencing server, the shared screen created at the remote server by sending the application screen update to the virtual device from the application; and update the display of the shared screen with the shared screen update, wherein the shared screen update is simultaneously displayable by the viewer application and one or more of the further viewer applications at corresponding further remote clients during the live data conference.

42. The computer program of claim 41, wherein the shared screen update represents only the portion of the application screen that was edited.

43. The computer program of claim 42, further comprising:

present a display of the shared screen on a display device attached to the client.

44. The computer program of claim 43, further comprising:

revise the display of the shared screen on the display device using the shared screen update.

45. A computer program, the computer program tangibly stored on a computer-readable medium, containing instructions for causing a computer to:

create a shared screen for use in a live data conference, the shared screen being created at a server by sending an application screen generated by an application to a virtual device;

send the shared screen to a conferencing server, the conferencing server to distribute the shared screen to a plurality of remote clients;

simultaneously present, on a display device attached to each of the remote clients, a display of the shared screen during the live data conference;

collect user input from a user at one of the remote clients;

send the user input to the remote server;

cause the application at the remote server to edit the application screen based on the user input to produce an application screen update;

create a shared screen update at the remote server by sending the application screen update to the virtual device, wherein the shared screen update represents only the portion of the application screen that was edited;

send the shared screen update to the conferencing server, the conferencing server to send the user input to the plurality of remote clients; and revise the display of the shared screen on each display device using the shared screen update.

* * * * *